May 1, 1956

H. O. HILL ET AL 2,743,594

TIMING DEVICE FOR FUEL INJECTION APPARATUS

Filed Aug. 8, 1951

HARRY O. HILL
ROBERT S. JOHNSON
INVENTORS

BY Raymond A. Paquin
ATTORNEY

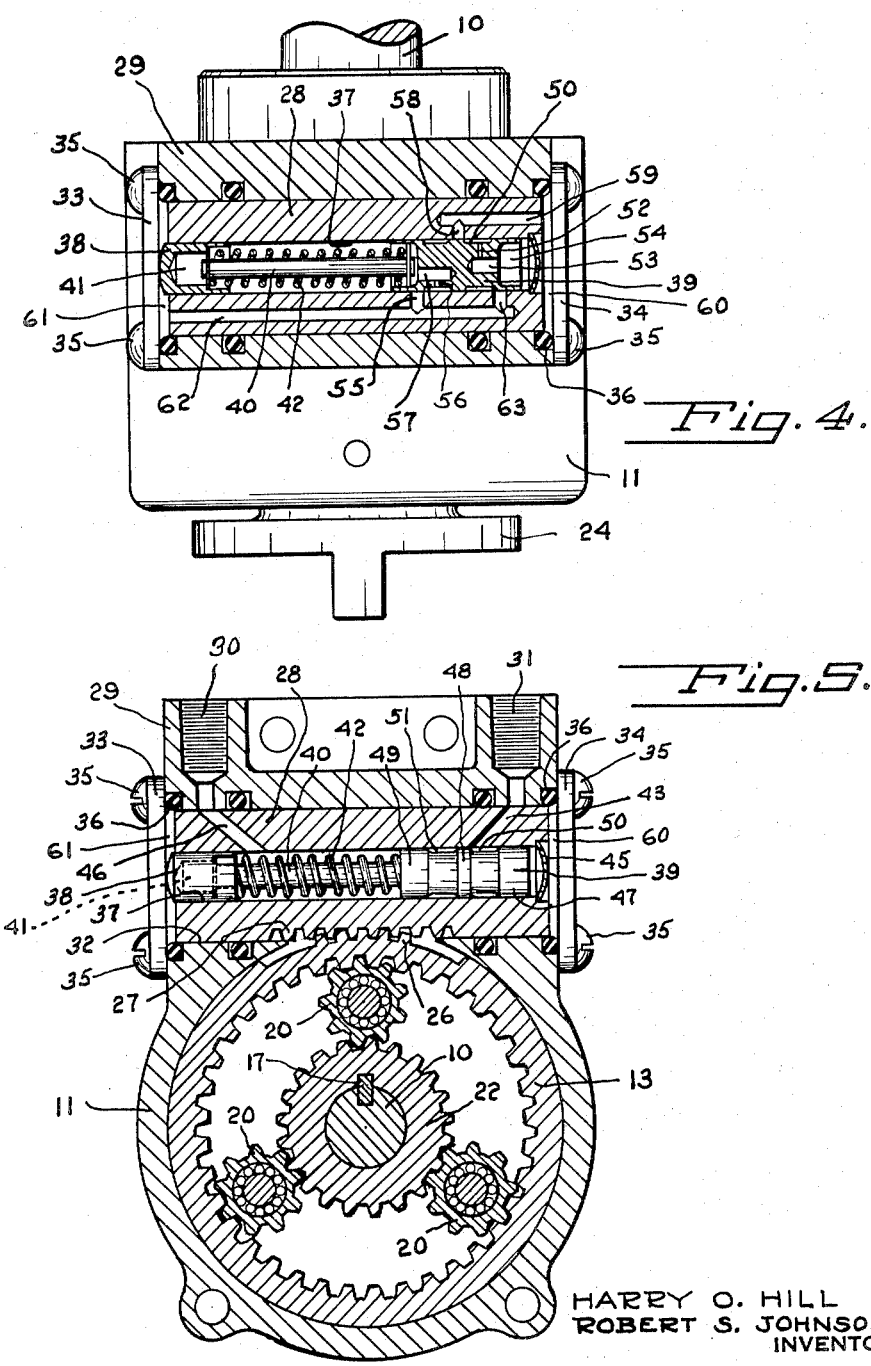

HARRY O. HILL
ROBERT S. JOHNSON
INVENTORS

May 1, 1956 H. O. HILL ET AL 2,743,594
TIMING DEVICE FOR FUEL INJECTION APPARATUS
Filed Aug. 8, 1951 7 Sheets-Sheet 4

HARRY O. HILL
ROBERT S. JOHNSON
INVENTORS

BY Raymond A. Paquin
ATTORNEY

May 1, 1956  H. O. HILL ET AL  2,743,594
TIMING DEVICE FOR FUEL INJECTION APPARATUS
Filed Aug. 8, 1951  7 Sheets-Sheet 6
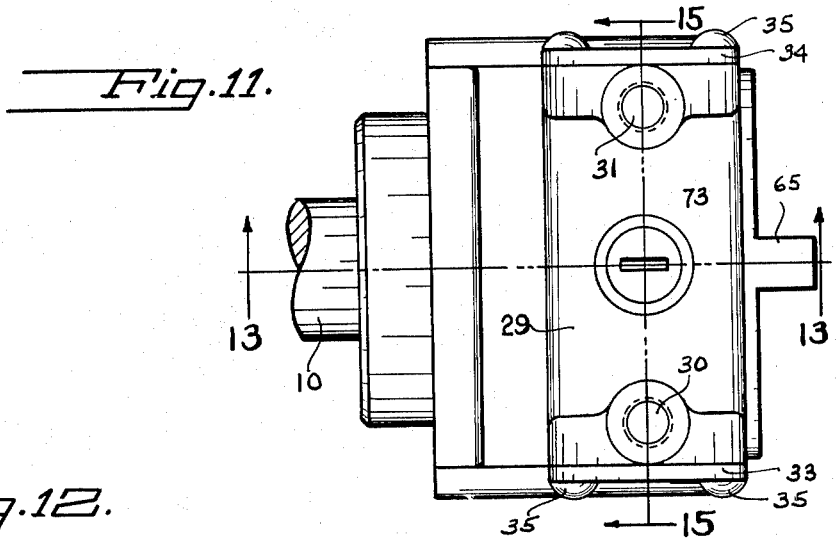
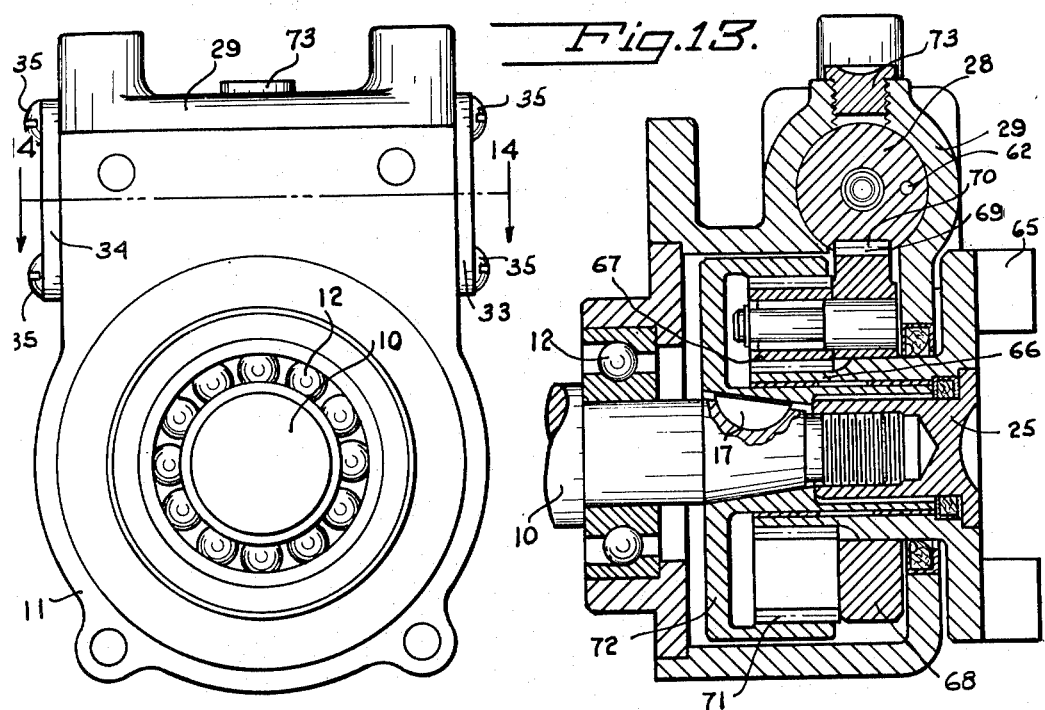
HARRY O. HILL
ROBERT S. JOHNSON
INVENTORS
BY
Raymond A. Paquin
ATTORNEY

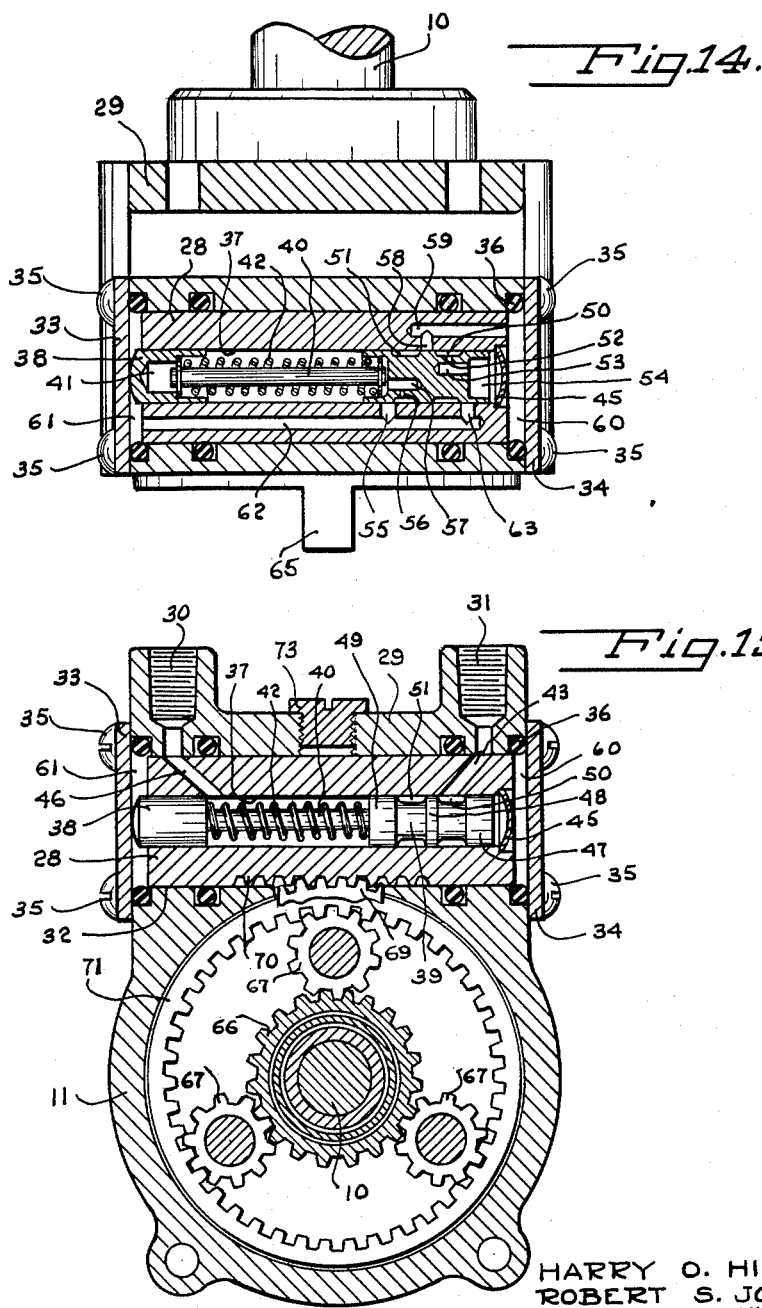

United States Patent Office 2,743,594
Patented May 1, 1956

2,743,594

TIMING DEVICE FOR FUEL INJECTION APPARATUS

Harry O. Hill, Lansing, and Robert S. Johnson, Lake Odessa, Mich., assignors to American Bosch Arma Corporation, a corporation of New York Application August 8, 1951, Serial No. 240,922

5 Claims. (Cl. 64—25)

This invention relates to timing devices for fuel injection pumps whereby each injection by the pump will be injected at the correct time for any particular speed at which the engine operates.

An object of the invention is to provide an automatic timing arrangement for use with a fuel injection pump.

Another object is to provide such a device which is simple and rugged in construction and which automatically controls the timing of injection as a function of speed and without outside influence.

Another object is to provide such a device which is controlled by the governor for the fuel injection pump.

Another object is to provide such a device which is adapted for use in combination with a hydraulic governor.

Another object is to provide a hydraulically controlled timing apparatus for a fuel injection pump.

Another object is to provide a hydraulic timing device for fuel injection pumps wherein the servo mechanism of the timing device is hydraulically operated.

Another object is to provide a timing device which is capable of employment with the hydraulic governor of our application Serial No. 225,532 filed May 10, 1951, and to be used in connection with the fuel injection pump of our application Serial No. 196,484, filed November 18, 1950.

Other objects and advantages of the invention will be apparent from the following description taken in connection with the accompanying drawings wherein the preferred form of the invention has been shown by way of illustration only and it will be understood that changes may be made in the details of construction and arrangements of parts without departing from the scope of the invention as set forth in the accompanying claims.

Referring to the drawings:

Fig. 4 is a sectional view taken on line 4—4 of Fig. 2, looking in the direction of the arrows;

Fig. 5 is a sectional view taken on line 5—5 of Fig. 1, looking in the direction of the arrows;

Fig. 11 is a view generally similar to Fig. 4 but showing a form of the device adapted for operation at crankshaft speed;

Fig. 12 is a view generally similar to Figs. 2 and 7 but showing the crankshaft speed form of the device of Fig. 11;

Fig. 13 is a sectional view taken on line 13—13 of Fig. 11, looking in the direction of the arrows;

Fig. 14 is a sectional view taken on line 14—14 of Fig. 12, looking in the direction of the arrows; and Fig. 15 is a sectional view taken on line 15—15 of Fig. 11, looking in the direction of the arrows.

Figure 1:
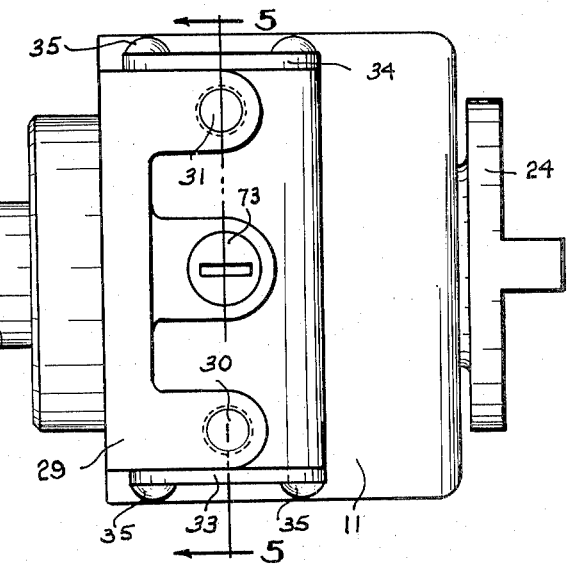
Fig. 1 is a top or plan view of an engine speed drive (one-half crankshaft speed) form of the device.
Figure 2:
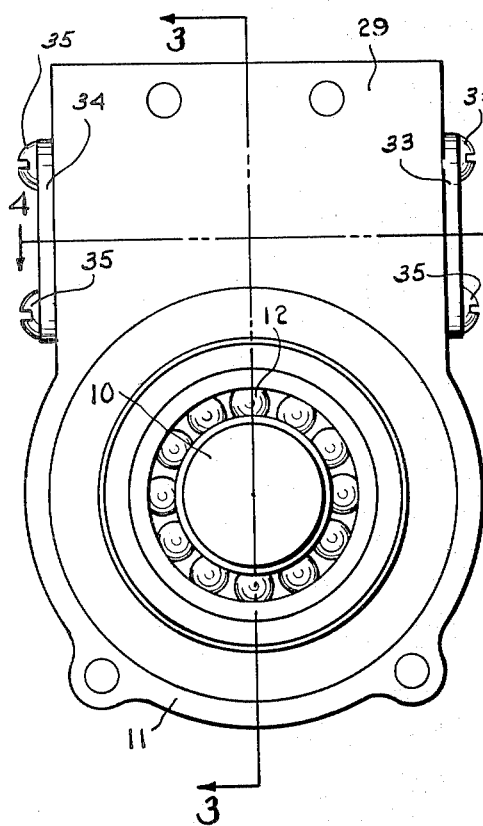
Fig. 2 is an end view thereof.

Referring more particularly to the drawings wherein similar reference characters designate corresponding parts throughout, the invention which relates to a timing device for adjusting the timing of a fuel injection pump in order that each injection will take place at the correct time for any particular speed at which the engine operates and which timing device is controlled by a governor which supplies the speed index, which governor is preferably of the hydraulic type, a satisfactory form of which is shown in our application Serial Number 225,532, filed May 10, 1951, and which timing device is adapted to be on the shaft 10 of the fuel injection pump and be operated thereby and comprises housing 11 carried on the end of shaft 10 and which shaft is rotatably mounted relative to housing 11 through bearing 12.

Within housing 11 is provided the internal ring or annular gears 13 and 14.

Gear 14 is retained in fixed position relative to housing 11 by key 15 while gear 13 is adjustable, as hereinafter described, whereby the phase relationship between gears 13 and 14 is changed.

Hub 16 is keyed to the end of shaft 10 by key 17 and spider 18 is carried on hub 16.

Spider 18 has the shafts 19 carrying gear clusters 20 and 21 at their opposite ends adapted to mesh with ring gears 13 and 14 respectively and said gear clusters 20 and 21 are adapted to be driven by gears 22 and 23 on hub 16.

The engine driven drive coupling 24 is retained on hub 16 and said hub 16 is retained on the end of shaft 10 by means of locking or holding member 25 which has a portion in threaded engagement with the threaded end of shaft 10 and an enlarged head portion serving to retain the members in operative relation. Drive coupling 24 is rotatably mounted on hub 16.

The ring gear 13 has the externally toothed portion 26 with the threaded area in threaded engagement with the toothed portion 27 of servo piston 28 whereupon adjustment of servo piston 28 serves to adjust ring gear 13.

The engine drives coupling 24 which drives gear 23 and therethrough drives gears 21 which drives gears 20 and thereby drive gear 22 and shaft 10 which is keyed thereto and the phase relationship of ring gears 13 and 14 is adapted to be automatically varied, as hereinafter described, to vary the phase relationship between the pump shaft 10 and the drive coupling 24 to control the timing of injection by the pump.

The servo piston 28 is within an extension 29 on housing 11, which extension has the couplings 30 and 31 of which the coupling 31 is adapted to be connected to the centrifugal pressure area of a hydraulic governor such as shown in our application Serial Number 225,532, which pressure area is controlled by a centrifugal pressure regulator and the other coupling 30 is connected by a return line to the fluid sump of the governor.

The connections of couplings 30 and 31 could be reversed upon reversal of servo piston 28.

It will be seen from the above that the pressure in the area controlled by the pressure regulating valve of the governor is tapped and brought to the timing device and actuates the same and that because of high pressure in said area at high speeds and low pressure at low speeds, that it is possible to use such pressure to actuate the servo mechanism of the timing device.

The servo piston construction is generally similar to that shown in our application Serial Number 196,484 and comprises transverse slideway 32 in which is mounted servo piston or slide 28 for reciprocating movement in said slideway 32 and said servo piston 28 has the threaded portion 27 meshing with threaded portion 26 on ring gear 13 whereby any sliding movement of servo piston 28 will be transmitted through said gearing to ring gear 13 to change the phase relationship of gears 13 and 14 and thus change the timing of the pumping strokes of the plunger of the fuel injection pump to correspondingly change the times of injections by the pump.

Slideway 32 is closed at its opposite ends by caps 33 and 34 which are held in position by screws 35 or other suitable means and are sealed by washers or gaskets 36, and said slide or piston 28 is provided with an axial opening or bore 37 in the opposite ends of which are positioned th spaced sliding members 38 and 39 which are retained in spaced relation by rod 40 adapted to enter bore 41 in member 38 and on which is positioned coil spring 42 which normally retains said rod out of said bore 41 and said members 38 and 39 in spaced relation except when the force of said spring 42 is overcome by hydraulic force of fluid passing through passageway 43 connecting coupling 31 with bore 37 as pressure in the pressure area of the governor increases and this force actuates valve 39. It will be noted particularly that the timing of injection is a direct function of speed.

If desired, limiting means may be provided for limiting the movement of valve 39 towards member 38. Closure 45 limits its movement in the opposite direction.

Bore 37 is connected by passageway 46 to coupling 30.

Valve member 39 is provided with spaced land portions 47, 48 and 49 separated by the circumferential grooves 50 and 51.

Fuid passing under pressure through passageway 43 and annular groove 50 will pass through restricted opening 52 to passageway 53 from which it will pass into the chamber 54 behind pilot valve 39 and pressure of this fluid forces said pilot valve against the action of spring 42 until annular groove 51 is in communication with passageway 55, which then, through restricted opening 56 places said passageway 55 in communication with the low pressure side of pilot valve 72 through passageway 57.

While this is taking place, land 48 of pilot valve member 39 uncovers passageway 58 and allows fluid to pass through passageway 59 to chamber 60 and then force servo piston 28 in a direction away from cover 34 to alter the timing of injection by the pump. When the speed of the pump is reduced then pressure in passage 43 drops and spring 42 forces pilot valve 39 in a direction toward cap or cover 34 and then port 55 is uncovered and communicates with passageway 43 through annular groove 51 which places passage 43 in communication with chamber 61 through passage 62 and builds up pressure in chamber 61 and at the same time land 49 closes passage 55 and land 47 closes passage 63 and allows fluid to pass from chamber 60 through said passage 63 and restricted opening 56 and passage 57 to the low pressure side of the valve.

The form of the invention shown in Figs. 6 through 10 is generally similar to that shown in Figs. 1 through 5 except that in the construction of Figs. 6 through 10, instead of coupling 24 a second shaft 64 is provided which shaft is provided with a key 65 for keying the shaft to the engine drive and said second shaft is journaled in a bearing 66 and gear 23 is integral with shaft 64. Otherwise the two constructions are similar and both are intended for use in those applications where the pump is to be operated at one-half crankshaft speed, that is the drive coupling will rotate at the same speed as the fuel injection pump shaft.

In Figs. 11 through 15 is shown a construction adapted to permit a crankshaft speed drive to be employed, that is, the driving coupling will rotate at twice the speed of the fuel injection pump shaft.

In this arrangement the engine coupling 65 has the gear 66 formed integral therewith which drives gear cluster 67 on spider 68 which has an external gear 69 meshing with gear sector 70 on servo piston 28. Gears 67 mesh with internal ring gear 71 on spider 72 which is keyed to shaft 10.

Due to the gear ratios being such that the driving coupling 65 will rotate at twice the speed of the fuel injection pump shaft 10, this form of the invention may be used on half engine speed pumps on an engine speed application.

The servo piston and hydraulic actuating system therefor is the same for all three forms shown and described.

Figure 3:
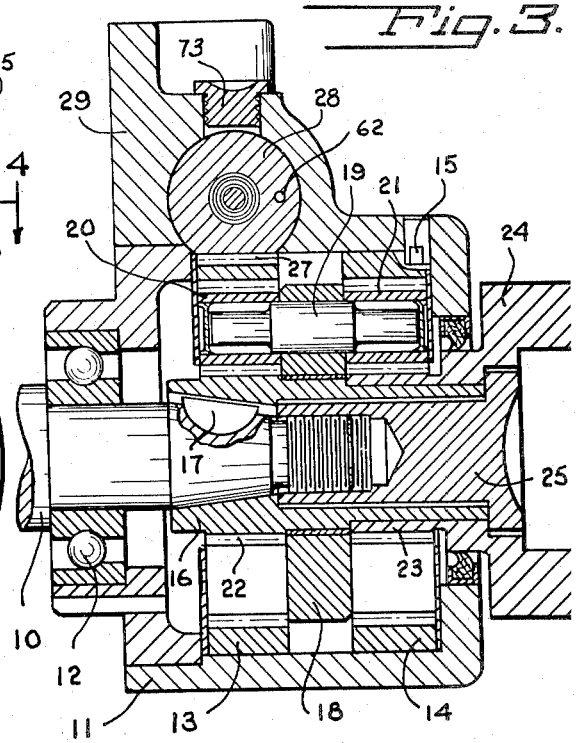
Fig. 3 is a sectional view taken on line 3—3 of Fig. 2, looking in the direction of the arrows.
Figure 6:
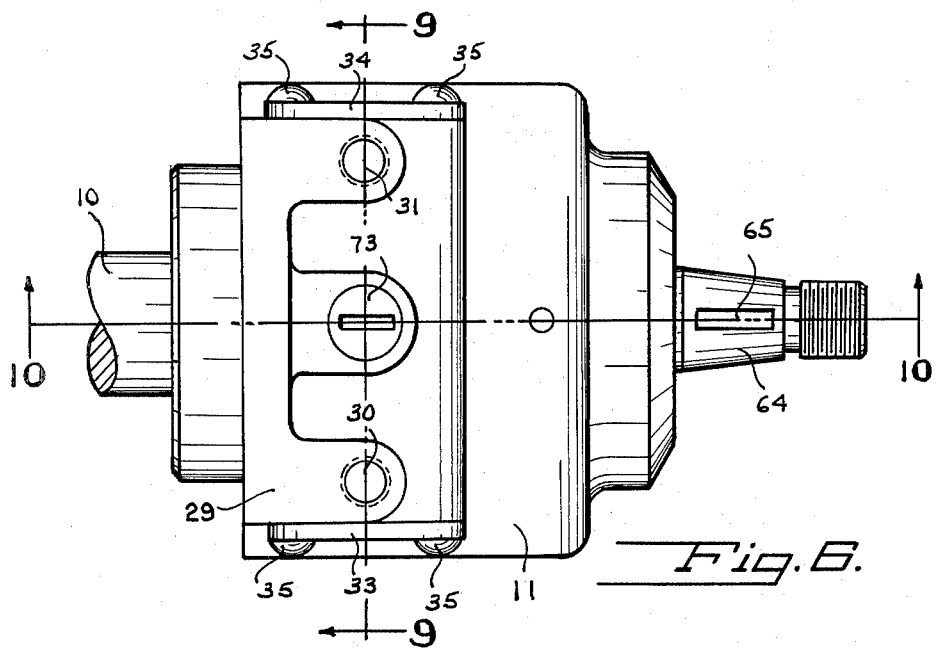
Fig. 6 is a top or plan view generally similar to Fig. 1 but showing a slightly different form of drive.
Figure 7:
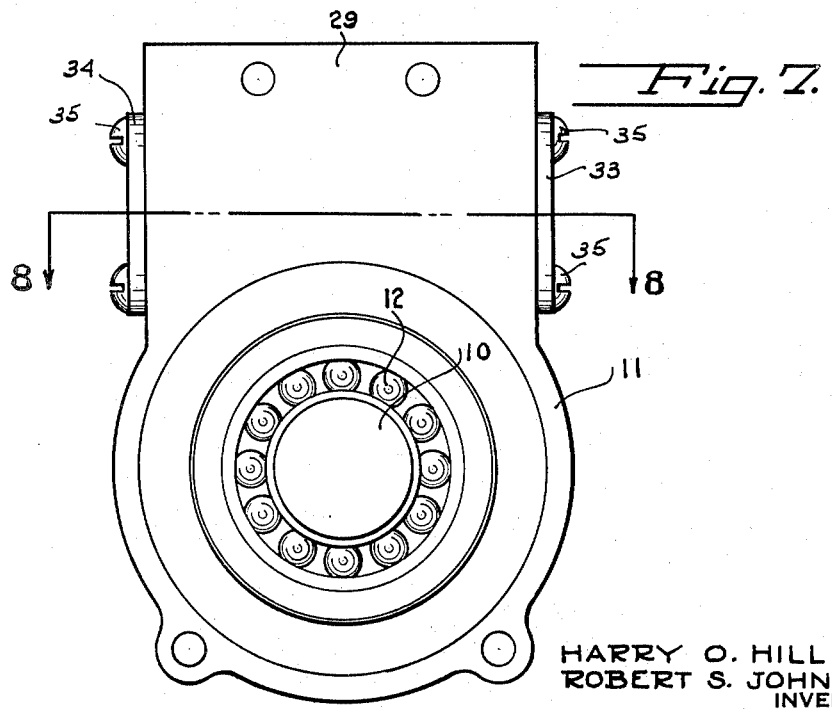
Fig. 7 is an end view of the device shown in Fig. 6.
Figure 8:
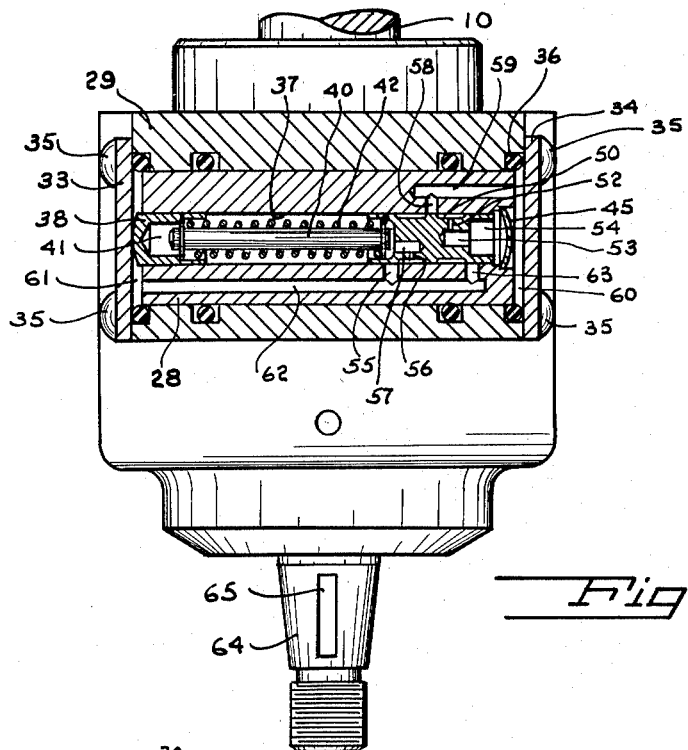
Fig. 8 is a sectional view taken on line 8—8 of Fig. 7, looking in the direction of the arrows.
Figure 9:
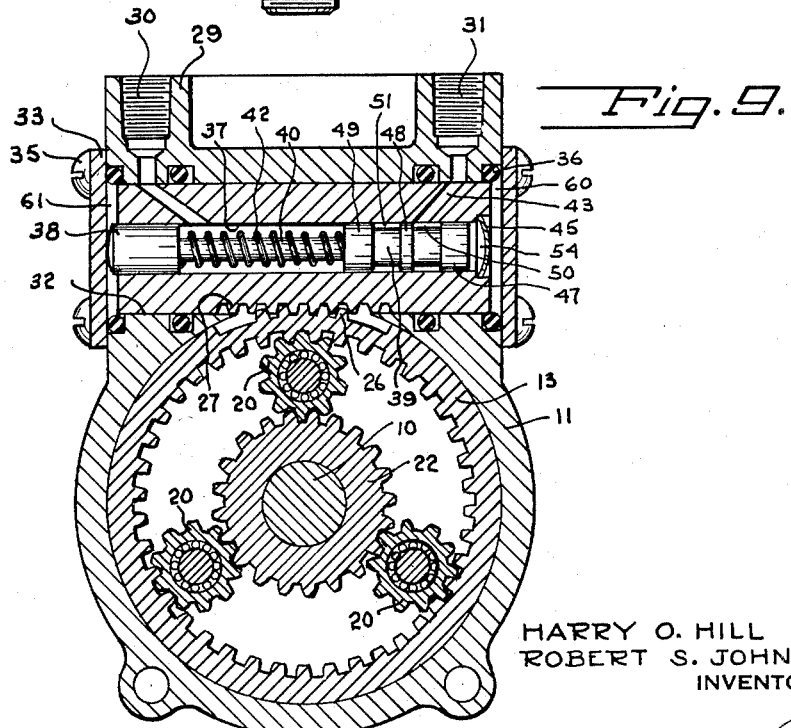
Fig. 9 is a sectional view taken on line 9—9 of Fig. 6, looking in the direction of the arrows.
Figure 10:
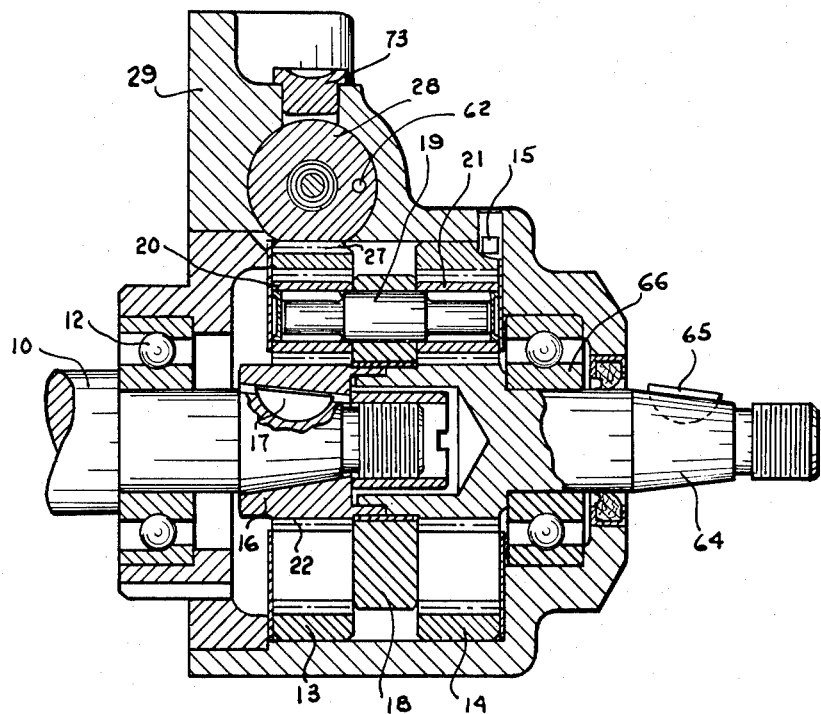
Fig. 10 is a sectional view taken on line 10—10 of Fig. 6, looking in the direction of the arrows.

The threaded plug 73, as shown in Figs. 3 and 10 may be provided in any of the forms which plug is a removable timing inspection plug.

The operation of the device has been set forth above in connection with the description of the various features of the device, from which it is believed apparent.

From the foregoing it will be seen that we have provided means for obtaining all of the objects and advantages of the invention.

We claim:

1. In a device of the character described, a drive shaft, a shaft adapted to be driven by said drive shaft and means for operatively connecting said shafts and adjusting the angular relationship between said drive shaft and said driven shaft, said means comprising a pair of ring gears, a pair of connected gears each engaging one of said ring gears, one of said connected gears being operatively connected to said drive shaft, the other of said connected gears operatively connecting its respective ring gear and said driven shaft and means for varying the phase relationship of said ring gears to thereby adjust the angular relationship between said drive shaft and said driven shaft.

2. In a device of the character described, a drive shaft, a shaft adapted to be driven by said drive shaft and means for operatively connecting said shafts and adjusting the angular relationship between said drive shaft and said driven shaft, said means comprising a pair of ring gears, a pair of connected gears each engaging one of said ring gears, one of said connected gears being operatively connected to said drive shaft, the other of said connected gears operatively connecting its respective ring gear and said driven shaft and means including a hydraulically actuated member having a gear sector engaging a gear sector on one of said ring gears for varying the phase relationship of said ring gears to thereby adjust the angular relationship between said drive shaft and said driven shaft.

3. In a device of the character described, a drive shaft, a shaft adapted to be driven by said drive shaft and means for operatively connecting said shafts and adjusting the angular relationship between said drive shaft and said driven shaft, said means comprising a pair of ring gears, a plurality of gear clusters each comprising a pair of connected gears each engaging one of said ring gears, one of each of said pairs of connected gears being operatively connected to said drive shaft, the other of each of said pairs of connected gears operatively connecting its respective ring gear and said driven shaft and means for varying the phase relationship of said ring gears to thereby adjust the angular relationship between said drive shaft and said driven shaft.

4. In a device of the character described, a drive shaft, a shaft adapted to be driven by said drive shaft and means for operatively connecting said shafts and adjusting the angular relationship between said drive shaft and said driven shaft, said means comprising a pair of ring gears, a pair of connected gears each engaging one of said ring gears, one of said connected gears being operatively connected to said drive shaft, the other of said connected gears operatively connecting its respective ring gear and said driven shaft and means including a hydraulically actuated member having a gear sector engaging a gear sector on one of said ring gears for varying the phase relationship of said ring gears to thereby adjust the angular relationship between said drive shaft and said driven shaft.

5. In a device of the character described, a driven shaft, a shaft adapted to be driven by said drive shaft and means for operatively connecting said shafts and adjusting the angular relationship between said drive shaft and said driven shaft, said means comprising a pair of ring gears, a plurality of gear clusters each comprising a pair of connected gears each engaging one of said ring gears, one of each of said pairs of connected gears being operatively connected to said drive shaft, the other of each of said pairs of connected gears operatively connecting its respective ring gear and said driven shaft and means for varying the phase relationship of said ring gears to thereby adjust the angular relationship between said drive shaft and said driven shaft and a spider retaining said gear clusters in operative position.

References Cited in the file of this patent

UNITED STATES PATENTS

| | | |
|---|---|---|
| 927,103 | Bogert | July 6, 1909 |
| 1,402,408 | Firebaugh | Jan. 3, 1922 |
| 2,005,063 | Wild et al. | June 18, 1935 |
| 2,107,070 | Fleury | Feb. 1, 1938 |

FOREIGN PATENTS

| | | |
|---|---|---|
| 368,332 | Italy | Feb. 14, 1939 |
| 129,981 | Switzerland | Jan. 2, 1929 |
| 538,620 | Great Britain | Aug. 11, 1941 |